(12) United States Patent
Holzmann et al.

(10) Patent No.: US 8,351,863 B2
(45) Date of Patent: Jan. 8, 2013

(54) SWITCHING DEVICE

(75) Inventors: Gottfried Holzmann, Zorneding (DE);
Werner Mittermaier, Erding (DE);
Thomas Lutz, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 522 days.

(21) Appl. No.: 12/441,427

(22) PCT Filed: Mar. 3, 2008

(86) PCT No.: PCT/EP2008/001695
§ 371 (c)(1),
(2), (4) Date: Mar. 16, 2009

(87) PCT Pub. No.: WO2008/113470
PCT Pub. Date: Sep. 25, 2008

(65) Prior Publication Data
US 2010/0052695 A1  Mar. 4, 2010

(30) Foreign Application Priority Data

Mar. 22, 2007 (DE) .................... 10 2007 013 756

(51) Int. Cl.
*H04B 17/00* (2006.01)
(52) U.S. Cl. .................... 455/67.11; 324/520
(58) Field of Classification Search ...... 455/67.11–67.7; 324/520; 370/246–251
See application file for complete search history.

(56) References Cited

U.S. PATENT DOCUMENTS

| 6,208,202 B1* | 3/2001 | Kaufman et al. ............... 330/51 |
| 2004/0192212 A1* | 9/2004 | Hagen .................... 455/67.11 |
| 2005/0186914 A1 | 8/2005 | Heaton et al. |

FOREIGN PATENT DOCUMENTS

| DE | 10324745 A1 | 12/2004 |
| EP | 0734192 A2 | 9/1996 |
| JP | 2000-009776 A | 1/2000 |
| WO | 2005081994 A2 | 9/2005 |

OTHER PUBLICATIONS

International Search Report, WO 2008/113470 A1, Rohde & Schwarz GmbH & Co. KG, Sep. 25, 2008, pp. 23-26.
International Preliminary Report on Patentability, PCT/EP2008/001695, Oct. 6, 2009, pp. 1-5.

* cited by examiner

*Primary Examiner* — Lincoln Donovan
*Assistant Examiner* — Diana J Cheng
(74) *Attorney, Agent, or Firm* — Ditthavong Mori & Steiner, P.C.

(57) ABSTRACT

The invention relates to a switching device for the alternate connection of at least one first test port or of a second test port to a measuring-device connection, where the measuring-device connection provides at least one test-signal input. The test-signal input is connected to a first signal path and to a second signal path, where the first signal path is connected alternately to the first or to the second test port, and the second signal path is connected at least to the respectively other test port.

20 Claims, 2 Drawing Sheets

SWITCHING DEVICE

CROSS-REFERENCE TO RELATED APPLICATION

The present application claims priority to German Patent Application No. 10 2007 013 756.9, filed on Mar. 22, 2007, and PCT Application No. PCT/EP2008/001695, filed on Mar. 3, 2008, the entire contents of which are herein incorporated by reference.

BACKGROUND OF THE INVENTION

1. Field of the Invention

The invention relates to a switching device for the alternate connection of a first or a second test port to a measuring device.

2. Discussion of the Background

In the production of mobile telephones, it is conventional to test the finished mobile-telephone devices with regard to their function. For this purpose, the mobile-telephone devices are connected to a measuring device, which emulates a base station. After the contacting of the measuring device, the mobile-telephone devices are first synchronized to the time raster of the measuring device, and a connection is then set up. The actual test procedure can be implemented when the connection has been set up. A procedure of this kind is disclosed in DE 103 24 745 A1. During the connection between the measuring device and the mobile-telephone device under test, test signals are transferred from the measuring device to the mobile-telephone device under test, and the signal transmitted back from the mobile-telephone device is evaluated.

In general, a measuring device comprises a bi-directional connection, across which the test signal is output and the measured signal, that is to say, the signal returning from the mobile-telephone device, is also read in. In the production of mobile-telephone devices, every device manufactured is tested with regard to its function or respectively with regard to the fulfillment of the relevant specifications. Accordingly, a considerable time is lost in changing the individual devices, which must be connected to the test port of the measuring device. The use of a switching device in order to save at least the amount of time, which is required for contacting the mobile-telephone devices, is therefore already known. This switching device provides a first and a second test port. The two test ports are structured in an identical manner, wherein each test port can be connected at the same time to a mobile-telephone device. The switching device contains switching means, with which respectively one of the two test ports can be connected to the bi-directional measuring-device connection of the measuring device. In this manner, a new mobile-telephone device to be tested can already be contacted, while the measurement on another is still running. After the completion of this measurement, the switching device is then activated without the need to separate the mobile-telephone device, for which the measurement has just been completed. Accordingly, while the measurement on the second mobile-telephone device is running, a change of device can be implemented at the other test port.

The disadvantage with a known test station of this kind is that a synchronization process between the mobile-telephone device now to be tested and the measuring device is implemented only after the activation of the single switching device because respectively one of the two test ports is completely separated from the measuring device dependent upon the switch position of the switching device.

SUMMARY OF THE INVENTION

The object of the invention is to provide a switching device, with which the overall testing time can be further reduced.

This object is achieved by the switching device as disclosed herein.

The switching device according to the invention provides at least a first and a second test port, which are each provided for connection to one device under test, in particular a mobile-telephone device. Furthermore, the switching device provides a measuring-device connection for connecting the switching device to a measuring device. The measuring-device connection comprises at least one test-signal input. According to the invention, the test-signal input is connected to a first signal path and to a second, attenuated signal path. The first signal path is connected alternately to the first test port or the second test port or to a further test port. The second signal path is connected at least to the at least one respectively other test port.

In this manner, during the implementation of a measurement, not only the mobile-telephone device directly under test is supplied with the test signal, but also the respectively other connection is already supplied with the test signal, however, with a weakened signal strength. This targeted crosstalk of the test signal generated by the measuring device on the respectively other test port allows a mobile-telephone device already connected to the other test port to synchronize with the measuring device. When the actual measurement with the mobile-telephone device coupled to the test port connected to the first signal path has been completed, the first signal path is connected to the other test port. The mobile-telephone device connected to the other test port can therefore now be tested. At the same time, during the implementation of the measurement on the mobile-telephone device, which is connected to the other, for example, the second test port, a device change can be implemented at the first test port. Since a crosstalk of the test signal via the second signal path to the first test port takes place during the measurement at the second test port, a synchronization of the newly-connected and contacted mobile-telephone device can once again already be implemented here at the same time. When the measurement of the mobile-telephone device connected to the second test port has been completed, the switching device is again activated and the first signal path is reconnected to the first test port.

In this manner, the overall time, that is to say, the time interval, which elapses between the completion of a measurement of one mobile-telephone device and the completion of the measurement of the next mobile-telephone device, can be considerably reduced. A considerable amount of this overall testing time is taken up by the synchronization. Since this synchronization can be implemented with the switching device according to the invention at the same time as the implementation of a measurement or a connection set-up at the respectively other test port, the overall testing time is considerably reduced.

In particular, it is advantageous to provide an attenuation device in the second signal path. The attenuation device achieves a de-coupling between the first signal path and the second signal path, which allows the undisturbed implementation of the actual measurement.

The second signal path preferably provides a branching device. The second signal path is divided through this branching device into a first signal branch and a second signal branch, which are connected to the first and respectively the second test port. The branching device ensures that, during the change of a mobile-telephone device at the first test port and also during the change of a mobile-telephone device at the second test port, even during the measurement at any of the test ports, a synchronization can be implemented at the respectively other test port. Accordingly, a continuous production procedure can be achieved during the testing of the mobile-telephone devices.

In the simplest case, the branching device can be designed as a splitter. A branching device of this kind in the form of a splitter is possible, if an adequate de-coupling is achieved between the first signal path and the second signal path. In this case, the weakened signal supplied to both test ports via the second signal path does not become an interference signal for the measurement implemented simultaneously at one of the two test ports via the first signal path.

In order to achieve a complete separation, it is particularly advantageous to design the branching device as a switching element. With the assistance of the switching element, it is then possible to switch between the first signal branch and the second signal branch, which are connected to the first and respectively the second test port. In this manner, the test signal supplied via the second signal path is supplied only to that test port, which is not currently connected to the first signal path.

For this purpose, the branching device is connected, in particular, via a first signal branch to the first test port, and via a second signal branch to the second test port, wherein a further switching element is preferably provided in each of the two signal branches. Through the respectively other switching element, the first test port or respectively the second test port can be connected either to the branching device or to a terminating resistor. Connecting the first or respectively the second test port via the further switching element to a terminating resistor ensures that an influence of the measurement does not occur via the open signal branch.

The attenuation device preferably comprises one attenuation element in the second signal path and a further attenuation element in every signal branch. A de-coupling is achieved through these attenuation elements arranged in a distributed manner, and accordingly, any influence of the potentially-present switches and terminating resistors is reduced.

The first and the second test port can preferably be connected alternately to a measured-signal output of the measuring-device connection. Accordingly, not only can the supplied test signal be connected in a targeted manner to the first or the second test port, but the measured signal transmitted in the opposite direction from the mobile-telephone device is also supplied in a targeted manner to the measuring device. Any mutual influence of the measured signal and in particular any impairment of the signal quality is therefore excluded.

A switch is preferably provided in each case for the alternate connection of the first test port or respectively of the second test port to the test-signal input or to the test-signal output. In particular, the two switches are connected to one another, so that it is possible to switch simultaneously between the two test ports both for a transmitted test signal and also for a measured signal to be received.

BRIEF DESCRIPTION OF THE DRAWINGS

A preferred exemplary embodiment of the switching device according to the invention is presented in the drawings and explained in greater detail in the description below. The drawings are as follows.

DETAILED DESCRIPTION OF EXEMPLARY EMBODIMENTS OF THE INVENTION

Figure 1:
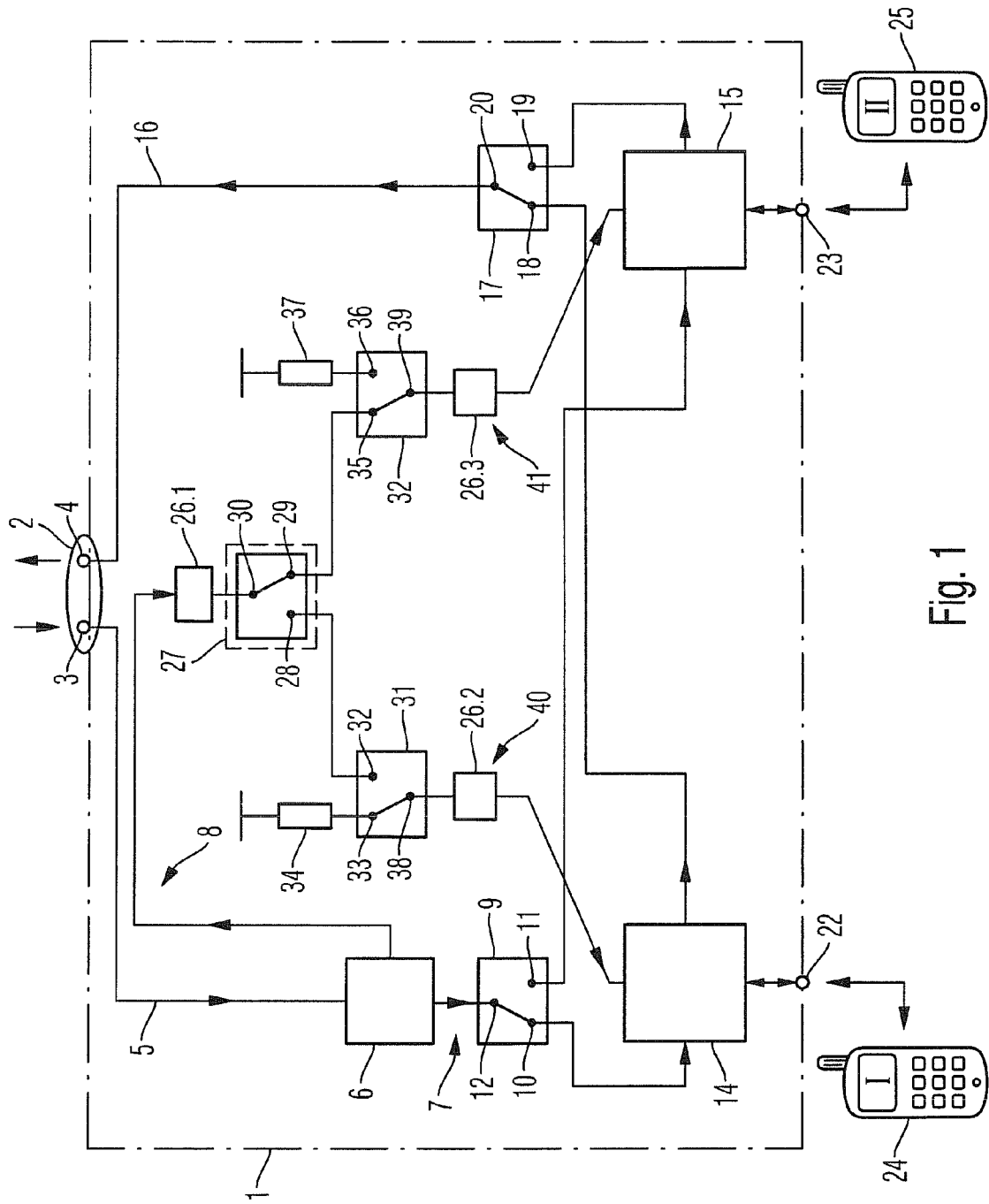
FIG. 1 shows a schematic presentation of a switching device according to the invention.

FIG. 1 shows a block-circuit diagram of a switching device 1 according to the invention. The switching device 1 according to the invention can be connected via a measuring-device connection 2 to a measuring device. In this context, the measuring-device connection 2 comprises a test-signal input 3 and a measured-signal output 4. A test signal generated by the measuring device, which is not illustrated, is supplied via the test-signal input 3. This supplied test signal is output via the switching device 1 to a given one of two connected mobile-telephone devices. The test signal, processed, for example, by the mobile-telephone device, or respectively the response signal, is transmitted back as a measured signal via the measured-signal output 4 to the connected measuring device where it is analyzed.

The test signal, which is to be supplied via the test-signal input 3 to the mobile-telephone device under test, is supplied via a test-signal input line 5 to a signal divider 6. The signal divider 6 divides the signal. A first signal component of the divided test signal is routed via a first signal path 7 to the connected mobile-telephone device under test. The second signal component is routed via a second signal path 8 for the synchronization of a second mobile-telephone device. In this context, the signal divider 6 can already comprise attenuation means, which lead to a weakening of the second signal component, for example, by 6 dB. By contrast, the first signal component is routed un-attenuated to the mobile-telephone device to be measured. Instead of an integration of the attenuation means in the signal divider 6, the attenuation can also be implemented in the region of the second signal path 8, as explained below.

A first switch 9 is provided in the signal path 7. With the assistance of the first switch 9, the first signal path can be supplied either to a first high-frequency connection device 14 or to a second high-frequency connection device 15. For this purpose, the first switch 9 provides a first test-signal output 10 and a second test-signal output 11. The first test-signal output 10 is connected to the first high-frequency connection device 14. By contrast, the second test-signal output 11 is connected to the second high-frequency connection device 15. Furthermore, the first switch 9 comprises a test-signal connection 12, which is permanently connected to the signal divider 6. The first switch 9 can generate alternately a connection between the test-signal connection 12 and the first test-signal output 10 or the second test-signal output 11. The first high-frequency connection device 14 is connected to a first test port 22. Correspondingly, the second high-frequency connection device 15 is connected to a second test port 23. Each of the test ports 22, 23 can be connected to a mobile-telephone device 24, 25.

Provided a first mobile-telephone device 24 is connected at the first test port 22 and a second mobile-telephone device 25 is connected at the second test port 23, with the assistance of the first switch 9, it is possible to select to which of the two mobile-telephone devices 24, 25 the first test signal is to be supplied with an un-attenuated signal strength. A measurement can then be implemented at this first or second test port, which is connected via the first switch 9 to the signal divider 6. For this purpose, the test signals are processed by the mobile-telephone device. A response signal is output by the mobile-telephone device corresponding to the specifications. This response signal is also supplied via the first test port 22 or the second test port 23 back to the first or respectively second high-frequency connection device 14, 15. The first high-frequency connection device 14 and the second high-frequency connection device 15 are connected via a second switch 17 to the measured-signal output 4.

The second switch 17 provides a first measured-signal input connection 18, which is connected to the first high-frequency connection device 14. Furthermore, the second switch 17 provides a second measured-signal input connection 19, which is connected to the second high-frequency connection device 15. For the transmission of the measured signal, which is supplied from the first mobile-telephone device 24 or respectively from the second mobile-telephone device 25 via the first high-frequency connection device 14 or the second high-frequency connection device 15 to the second switch 17, a connection is generated through the second switch 17 between the first measured-signal input connection 18 or the second measured-signal input connection 19 and an output 20 of the second switch 17. The output 20 of the second switch 17 is connected via a measured-signal line 16 to the measured-signal output 4 of the switching device 1.

Through the simultaneous activation of the first switch 9 and of the second switch 17, it is therefore possible to switch between measurements at the first test port 22 and the second test port 23. Accordingly, a first mobile-telephone device 24 and a second mobile-telephone device 25 can be contacted at the same time, wherein a connection to the measuring-device connection 2 is generated only by one mobile-telephone device 24 or 25.

In the case of measurements with mobile-telephone devices according to the GSM standard, for which the switching device according to the invention is preferably provided, a synchronization between the mobile-telephone device and the base station emulated by the measuring device must first be implemented before the actual measurement. For this purpose, a BCCH (Broadcast Control Channel) signal must be transmitted by the measuring device. This signal is evaluated by all of the mobile-telephone devices contactable and allows a time synchronization with the measuring device. Only after this can an individual connection be set up between the mobile-telephone device and the base station or a corresponding measuring device. When a connection between the measuring device and the mobile-telephone device has been set up, the individual test procedures can then be implemented as set out in the specification.

According to the invention, a second signal path 8 is now provided, across which the test signal is also transmitted with an attenuated signal strength to that test port 22 or 23, which is not connected to the first signal path 7. For example, if the first switch 9 is brought into its position illustrated in FIG. 1, a measurement can be implemented at the first mobile-telephone device 24. A targeted crosstalk of the test signal, which is supplied at the test-signal input 3, to the second test port 23 is possible through the second signal path 8. A synchronization can already be implemented there by the second mobile-telephone device 25. Accordingly, after the completion of the measurement on the first mobile-telephone device 24, a connection set-up can be implemented directly through the already-synchronized second mobile-telephone device 25 to the connected measuring device by activating the first switch 9. An additional time interval, which is required for the synchronization of the second mobile-telephone device 25 to the BCCH signal and therefore to the test signal of the measuring device, is not therefore necessary.

In one preferred embodiment, since attenuated test signals can already be supplied through the measuring device for the implementation of the measurements, the attenuation of the signal component, which is supplied to the second signal path 8, can be adjusted. Accordingly, even with a test signal supplied in an already-weakened manner, a signal strength of the second signal component, which is still sufficient for the synchronization, can therefore also be achieved through a smaller, further attenuation, for example, in the signal divider 6.

The second signal path 8 branches at a branching device 27 into a first signal branch 40 and a second signal branch 41. In the simplest example, the branching device 27 can be designed as a splitter. However, this presupposes that the signal components in the first signal path 7 and in the second signal path 8 are adequately de-coupled. In the illustrated exemplary embodiment, the branching device 27 is designed as a switch with a total of three connections 28, 29 and 30.

In the exemplary embodiment already described, in which the test-signal input 3 is connected via the first signal path 7 to the first test port 22, the switch is disposed in the position illustrated in FIG. 1. In this position, the connections 30 and 29 are connected to one another. The second signal component, which is branched via the signal divider 6 into the second signal path 8, is therefore supplied to the second signal branch 41. A switching element 32, coupled to the connection 29 of the switch of the branching device 27, is disposed in the second signal branch 41. For its part, the switching element 32 provides three connections 35, 36 and 39. While the connection 39 of the switching element 32 is connected to the second high-frequency connection device 15, the connection 35 of the switching element 32 is connected to the connection 29 of the switch of the branching device 27.

In the illustrated switch position of the switching element 32, the second signal component is therefore supplied via the common portion of the second signal path 8 between the signal divider 6 and the branching device 27 and the second signal branch 41 of the second high-frequency connection device 15. Accordingly, the second signal component is weakened on the signal route by an attenuation device.

In the illustrated exemplary embodiment, the attenuation device comprises three attenuation elements 26.1, 26.2 and 26.3. In this context, two attenuation elements 26.1 and 26.3 are disposed in the signal route of the second test-signal component. While the first attenuation element 26.1 is disposed in the common portion of the second signal path 8, the second and third attenuation elements 26.2 and 26.3 are disposed in the first signal branch 40 or respectively the second signal branch 41. The attenuation elements 26.2 and 26.3 are preferably disposed between a switching element 32 in the second signal branch 41 or respectively a further switching element 31 in the first signal branch 40 and the respectively-corresponding first high-frequency connection device 14 or respectively second high-frequency connection device 15. A de-coupling of the signal divider 6 from the branching device 27 is achieved through the first attenuation element 26.1. The second or respectively the third attenuation element 26.2 or 26.3 de-couples the first high-frequency connection device 14, and the further switching element 31 or respectively the second high-frequency connection device 15 and the switching element 32. With the use of a simple splitter as the branching device 27, the switching elements 31, 32 must be matched in order to ensure an adequate de-coupling.

In order to cut out the second signal branch 41 without influencing the measured results, a terminating resistor 37 is provided at the connection 36 of the switching element 32. Accordingly, a connection can be generated between the connections 39 and 36 by activating the switching element 32. The second signal branch 41 is therefore completely de-coupled from the common portion of the second signal path 8.

The object of the attenuation device is to bring about the de-coupling of the weakened signal component of the test signal, so that the measurement remains un-influenced. In this context, the further attenuation elements 26.2 and 26.3 cause the switch position of the switching elements 31 and respectively 32 to remain without influence on the measurement.

The first signal branch 40 is structured corresponding to the second signal branch 41. Here also, an attenuation element 26.2 is provided, which is arranged between the further switching element 31 and the first high-frequency connection device 14. The further switching element 31 also provides three connections 32, 33 and 38, wherein a terminal resistor 34 is provided at the connection 33.

The first switch 9 and the second switch 17 are preferably coupled to one another, so that, upon the activation of the switching device 1, the first switch 9 and the second switch 17 are simultaneously brought into their respectively other position. In the illustrated exemplary embodiment, the branching device 27 also preferably provides a switch, so that, in each case, only that test port 22 or 23, which is not connected to the signal divider 6 via the first signal path 7, is supplied with a weakened test signal. However, the use of only one splitter is also conceivable. In this case, not only the test port not connected via the first switch to the signal divider 6 receives the weakened test signal, but, on the contrary, it is supplied both in the direction towards the first high-frequency connection device 14 and also towards the second high-frequency connection device 15. However, this requires a matching of the switching element 32 and of the further switching element 31. It is then preferred if, in each case, one of the two switching elements 31, 32 generates a connection to the first or respectively second test port 22 or 23, and the other switching element 32, 31 is switched off. The respectively switched-off switching element 31 or 32 then represents a matched terminating resistor for the branching device 27, for example, of 50 ohms.

The combination or respectively the separation between the transmitted test signal and the received measured signal is implemented in the first high-frequency connection device 14 or respectively the second high-frequency connection device 15. Accordingly, the first test port 22 and the second test port 23 can be formed as a bi-directional interface with the first mobile-telephone device 24 and respectively the second mobile-telephone device.

Figure 2:
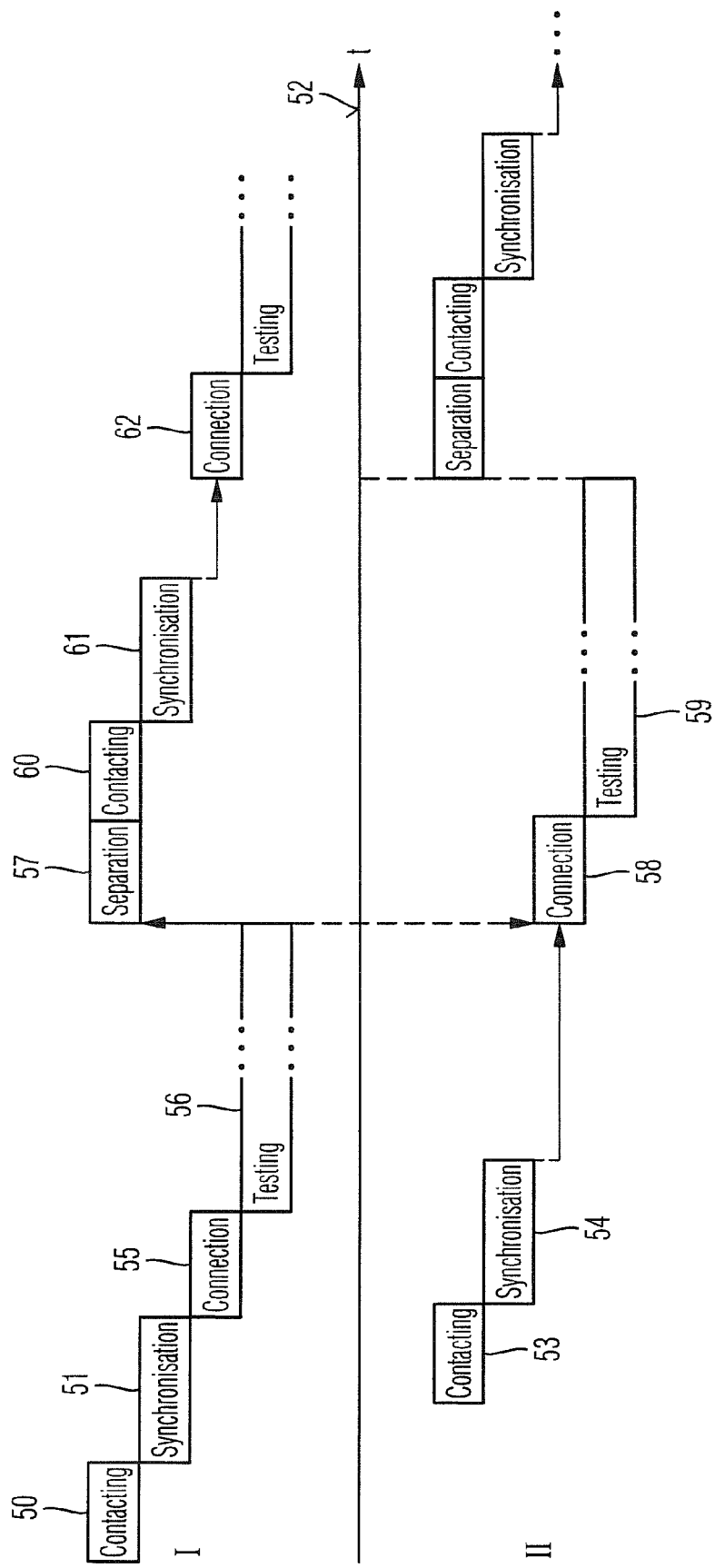
FIG. 2 shows a presentation by way of explanation of the time sequence during the implementation of measurements of mobile-telephone devices.

FIG. 2 shows a schematic presentation of the time sequence for the measurement of several mobile-telephone devices at a single measuring-device connection of the measuring device. In this context, "I" identifies the first test port 21 and "II" identifies the second test port 22. At the start, a first mobile-telephone device is initially connected to the first test port 22. After the contacting 50, the first mobile-telephone device receives a test signal. The first switch 9 and the second switch 17 are accordingly disposed in the position illustrated in FIG. 1. The test signal is supplied in a non-weakened form to the first mobile-telephone device, and a synchronization 51 to the BCCH signal contained therein is implemented. Even during this synchronization between the first mobile-telephone device and the measuring device, a second mobile-telephone device 25 can be connected to the second test port 23. This contacting 53 at the second test port 23 is illustrated below the time line 52. The branching device 27 allows a crosstalk of the test signal supplied to the test-signal input at the second test port 23, so that, after the contacting 53 of the second mobile-telephone device, a synchronization 54 of the second mobile-telephone device 25 is implemented at the second test port 23.

After the synchronization 51 of the first mobile-telephone device at the first test port 22 has been completed, a connection set-up 55 is implemented between the measuring device and the first mobile-telephone device 24. After the connection set-up 55 has been completed, a measurement 56 of parameters is implemented on the first mobile-telephone device 24 according to the specifications.

After the contacting 53 of the second mobile-telephone device 25 has been completed, the synchronization 54 on the basis of the cross-talking test signal or respectively of the BCCH signal contained in the second signal component is implemented at the second test port 23. After the completion of the synchronization 54, the second mobile-telephone device 25 is ready for a connection set-up. Since the measurement at the first test port 22 is not yet complete, all switches remain in the position illustrated in FIG. 1. After the completion of the measurement 56 at the first test port 22, the switching device 1 is activated, wherein an automatic identification of the completed measurement 56 is advantageous for this purpose. The first mobile-telephone device 24 is removed by an operating person, for example, from an adapter, and accordingly separated (57) from the first test port 22. However, before this is accomplished, at least the first switch 9 and the second switch 17 are brought into their respectively other position. Accordingly, the non-attenuated test signal is transmitted via the first signal path 7 to the second test port 23. As a result, a connection set-up 58 is implemented between the second mobile-telephone device 25 and the measuring-device connection 2. After a completion of the connection set-up 58 there, a measurement 59 is implemented on the mobile-telephone device 25 corresponding to the preceding measurement 56 on the first mobile-telephone device 24.

After the first mobile-telephone device 24 has been separated (57) from the first test port 22, a new mobile-telephone device is inserted into the adapter, and accordingly, a new contacting 60 between the first test port 22 and this mobile-telephone device is implemented. Since, in the meantime, the branching device 27 has also been brought into its other position, the attenuated signal is now transmitted via the second signal path 8 with the first signal branch 40 to the second test port 22. As a result, the third mobile-telephone device connected there can be synchronized (61). After the synchronization (61) of the third mobile-telephone device has been completed, the third mobile-telephone device is also transferred into a waiting condition. After the completion of the measurement 59 on the second mobile-telephone device 25, which is connected to the second test port 23, the first switch 9, the second switch 17 are activated, and accordingly, a connection set-up 62 between the third mobile-telephone device, which is connected to the first test port 22, is possible.

The switching device 1 according to the invention has the advantage that, for the measurement, the test signal, which is routed un-attenuated only to one of two test ports 22, 23, is supplied in a targeted manner in a weakened form to the respectively other test port 23, 22. The mobile-telephone device contacted there can accordingly already be synchronized, even before the measurement at the other test port has been completed. This achieves a considerable saving of time, because, by way of distinction from the previously-known method, the synchronization can already be implemented simultaneously with a measurement implemented at the other port.

The illustrated switching device 1 is particularly suitable for GSM mobile telephony. In this context, a so-called BCCH signal is used, in order a synchronization of the mobile-telephone devices with the respective base station, which is emulated in the case of a measurement by the measuring device, is generated. However, the switching device 1 can also be used advantageously, for example, in the context of mobile telephony of the third generation. In this context, the synchronization is initially implemented in the GSM mode, in order then to implement a handover, for example, to WCDMA after the completion of the connection set-up. Following this, the CDMA (Code Division Multiple Access) parameters can then be measured.

The invention has been explained with reference to the example of a switching device 1 with only two test ports 22, 23. Of course, an expansion to three or more ports is conceivable.

The invention is not restricted to the exemplary embodiment presented. On the contrary, individual combinations of features with one another are also possible.

The invention claimed is:

1. A switching device for the alternate connection of at least one first test port or one second test port to a measuring-device connection, wherein the measuring-device connection provides at least one test-signal input for inputting a test signal,
    wherein the test-signal input is connected to a signal divider, wherein the signal divider is configured to divide the test signal into a first test signal component and a second test signal component, and
    a first signal path is configured to route the first test signal component alternately to the first test port for connection to a first device under test or to the second test port for connection to a second device under test with a first switch, and
    a second signal path is configured to route the second test signal component at least to the respectively other test port, wherein
    the second test signal component is attenuated in the second signal path and the second test signal component is routed attenuated to the first or to the second test port and the first signal component is routed un-attenuated to the first or to the second test port, and
    a measurement can be implemented on one of the test ports with the first signal component, and a synchronization can be implemented simultaneously at the other test port with the second signal component.

2. The switching device according to claim 1, wherein the second signal path provides an attenuation device.

3. The switching device according to claim 2, wherein the second signal path provides a branching device, through which the second signal path is connected via a first signal branch or respectively via a second signal branch to the first and/or to the second test port.

4. The switching device according to claim 3, wherein the branching device is a splitter.

5. The switching device according to claim 4, wherein the attenuation device provides one attenuation element disposed in a common portion of the second signal path and a further attenuation element in every signal branch.

6. The switching device according to claim 3, wherein the branching device provides a switching element.

7. The switching device according to claim 3, wherein the branching device is connected via the first signal branch to the first test port and via a second signal branch to the second test port, wherein, respectively in the first and in the second signal branch, a switching element is provided, through which the first test port or respectively the second test port can be connected to a terminating resistor.

8. The switching device according to claim 2, wherein the first test port and the second test port can be connected alternately to a measured-signal output of the measuring-device connection.

9. The switching device according to claim 1, wherein the second signal path provides a branching device, through which the second signal path is connected via a first signal branch or respectively via a second signal branch to the first and/or to the second test port.

10. The switching device according to claim 9, wherein the branching device is a splitter.

11. The switching device according to claim 10, wherein the first test port and the second test port can be connected alternately to a measured-signal output of the measuring-device connection.

12. The switching device according to claim 9, wherein the branching device provides a switching element.

13. The switching device according to claim 12, wherein the first test port and the second test port can be connected alternately to a measured-signal output of the measuring-device connection.

14. The switching device according to claim 9, wherein the branching device is connected via the first signal branch to the first test port and via a second signal branch to the second test port, wherein, respectively in the first and in the second signal branch, a switching element is provided, through which the first test port or respectively the second test port can be connected to a terminating resistor.

15. The switching device according to claim 14, wherein the first test port and the second test port can be connected alternately to a measured-signal output of the measuring-device connection.

16. The switching device according to claim 9, wherein the attenuation device provides one attenuation element disposed in a common portion of the second signal path and a further attenuation element in every signal branch.

17. The switching device according to claim 16, wherein the first test port and the second test port can be connected alternately to a measured-signal output of the measuring-device connection.

18. The switching device according to claim 9, wherein the first test port and the second test port can be connected alternately to a measured-signal output of the measuring-device connection.

19. The switching device according to claim 1, wherein the first test port and the second test port can be connected alternately to a measured-signal output of the measuring-device connection.

20. The switching device according to claim 1, wherein a switch is provided respectively for the alternate connection of the first test port and of the second test port to the test-signal input or respectively to the measured-signal output.

* * * * *